(12) United States Patent
Parakkal et al.

(10) Patent No.: US 8,841,404 B2
(45) Date of Patent: Sep. 23, 2014

(54) FLAME RETARDANT BIO-BASED POLYMER BLENDS

(75) Inventors: Haseena Aripuram Parakkal, Malpurra (IN); Sriram Krishnamurthy, Chennai (IN); Wim Steendam, Bergen Op Zoom (NL); Gautam Chatterjee, Bangalore (IN)

(73) Assignee: SABIC Global Technologies B.V., Bergen op Zoom (NL)

( * ) Notice: Subject to any disclaimer, the term of this patent is extended or adjusted under 35 U.S.C. 154(b) by 286 days.

(21) Appl. No.: 13/110,102

(22) Filed: May 18, 2011

(65) Prior Publication Data

US 2012/0296020 A1 Nov. 22, 2012

(51) Int. Cl.
*C08L 69/00* (2006.01)
*C08L 83/04* (2006.01)
*C08L 83/10* (2006.01)
*C08K 5/5317* (2006.01)
*C08K 5/5357* (2006.01)

(52) U.S. Cl.
USPC ........... 528/196; 528/198; 528/271; 528/272; 524/115; 524/132; 524/500; 524/860; 524/861; 524/862

(58) Field of Classification Search
USPC .......... 528/196, 198, 271, 272; 524/500, 132, 524/115, 860, 862
See application file for complete search history.

(56) References Cited

U.S. PATENT DOCUMENTS

| | | | |
|---|---|---|---|
| 4,218,545 A | 8/1980 | Serini et al. | |
| 7,018,567 B2 * | 3/2006 | Murray | 252/511 |
| 7,138,479 B2 | 11/2006 | Dhara et al. | |
| 7,666,972 B2 * | 2/2010 | Jansen et al. | 528/196 |
| 7,786,246 B2 | 8/2010 | Jansen et al. | |
| 1,010,565 A1 | 5/2011 | Harder et al. | |
| 2006/0275569 A1 | 12/2006 | Mishra et al. | |
| 2008/0119631 A1 | 5/2008 | Mullen | |
| 2009/0043053 A1 | 2/2009 | Gorny et al. | |
| 2009/0105438 A1 | 4/2009 | Brack et al. | |
| 2010/0099832 A1 | 4/2010 | Jansen et al. | |
| 2012/0298548 A1 | 11/2012 | Riding | |
| 2013/0004442 A1 | 1/2013 | Bui et al. | |

FOREIGN PATENT DOCUMENTS

| | | |
|---|---|---|
| WO | WO-2009/062691 A1 | 5/2009 |
| WO | WO-2010/108964 A1 | 9/2010 |

OTHER PUBLICATIONS

S. Chatti et al., "Cyclic and Noncyclic Polycarbonates of Isosorbide (1,4:3,6-Dianhydro-D-glucitol)," Macromolecules, 2006, 39, pp. 9064-9070.
J. H. Schut, "What's Ahead for Green Plastics", Cover Story, Plastics Technology Magazine, Feb. 2008. pp. 64, retrieved from <http://www.ptonline.com/articles/what's-ahead-for'green'-plastics-look-for-more-supply-more-varieties-better-properties> on May 14, 2013.
Marzi, T., "Enviromental and Toxicological Properties of Exolit Flame Retardants Based on Alky-Phosphinic Acid Salts," Slide Presentation from Fraunhofer, Slides 1-7, Undated.
Non-Final Office Action issued on Dec. 18, 2012 for U.S. Appl. No. 13/110,101, filed May 18, 2011 (Inventor—Parakkal et al.; pp. 1-13).
Response to Non-Final Office Action filed on Apr. 18, 2013 for U.S. Appl. No. 13/110,101, filed May 18, 2011 (Inventor—Parakkal et al.; pp. 1-32).
Non-Final Office Action issued on Jun. 6, 2012 for U.S. Appl. No. 13/110,107, filed May 18, 2011 (Inventor—Parakkal et al.; pp. 1-8).
Response to Non-Final Office Action filed on Dec. 5, 2012 for U.S. Appl. No. 13/110,107, filed May 18, 2011 (Inventor—Parakkal et al.; pp. 1-14).
Final Office Action issued on Mar. 6, 2013 for U.S. Appl. No. 13/110,107, filed May 18, 2011 (Inventor—Parakkal et al.; pp. 1-9).

* cited by examiner

*Primary Examiner* — Satya Sastri
(74) *Attorney, Agent, or Firm* — Baker & Hostetler LLP

(57) ABSTRACT

Polycarbonate compositions having flame retardant properties and improved impact resistance are disclosed, together with methods for preparing the same.

19 Claims, No Drawings

FLAME RETARDANT BIO-BASED POLYMER BLENDS

BACKGROUND

1. Technical Field

The present disclosure relates to biosourced polycarbonate, and specifically to biosourced polycarbonate compositions having improved flame retardancy.

2. Technical Background

Polymers based on aliphatic diols derived from biologically-based sources are of great interest in the plastics industry and in manufacturing, for the preparation of materials and products that can be derived from inexpensive, renewable sources and that also are biodegradable, and thereby have a low net environmental impact. Of particular interest are polymers based on isosorbides. These materials are of great interest to the chemical industry, and in particular in the production of polymeric materials such as polycarbonates, because such aliphatic diols can be produced from renewable resources rather than from the petroleum feedstocks used to prepare other monomers useful in the production of polycarbonates, such as bisphenol monomers. This bio-sourced polycarbonate (PC) can have high tensile modulus, scratch resistance, and can be processed at 250° C.

For practical applications, polycarbonate incorporating isosorbide needs a balance of properties to be useful. Polycarbonates should have sufficiently high molecular weight for desirable mechanical properties, and sufficiently low glass transition temperatures and flow to be useful in molding and extrusion applications. In addition, because of their broad use, particularly in electronic applications, it is desirable to provide polycarbonates with flame retardancy. While bio-sourced polycarbonate can provide improved mechanical properties over conventional petroleum based polycarbonate materials, existing bio-sourced polycarbonate materials exhibit poor flame resistance and impact strength.

Nonhalogenated flame retardants have been proposed for polycarbonates, including various fillers, phosphorus-containing compounds, and certain salts. It has been difficult to meet the strictest standards of flame retardancy using the foregoing flame retardants, however, without also using brominated and/or chlorinated flame retardants, particularly in thin samples. In addition, existing non-brominated and/or non-chlorinated flame retardants can adversely affect desirable physical properties of the polycarbonate compositions, particularly impact strength.

Thus, there remains a continuing desire in the industry for continued improvement in flame retardance, including a need for polycarbonate compositions having improved flame retardance without use of brominated and/or chlorinated flame retardants. It would also be advantageous if improved flame retardance could be achieved without substantial degradation of properties such as impact strength. These needs and other needs are satisfied by the compositions and methods of the present disclosure.

SUMMARY

In accordance with the purpose(s) of the invention, as embodied and broadly described herein, this disclosure, in one aspect, relates to biosourced polycarbonate, and specifically to biosourced polycarbonate compositions having improved flame retardancy.

In one aspect, the present disclosure provides a polycarbonate composition prepared using a bio-sourced isosorbide, the composition comprising a phosphorus containing flame retardant composition, and a combination of a polysiloxane-polycarbonate copolymer and a silicone elastomer core-acrylic shell impact modifier.

In another aspect, the present disclosure provides a method for processing a polycarbonate material comprising contacting one or more polycarbonate precursors with a bis-phenol A diphenyl phosphonate and a silicone elastomer core-acrylic shell impact modifier.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a ketone" includes mixtures of two or more ketones.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

Unless specifically stated to the contrary, terms for components and materials used throughout the specification are listed in Table 1, below, together with a description and source.

(HDT), or a combination thereof. In another aspect, the inventive polymer is suitable for use in a variety of demanding application, such as, for example, automotive, electronics, and telecommunications applications.

Conventional flame retardant plastic materials, for applications such as automotive, electronics, and telecommunications, are produced from petroleum sources. The existing manufacturing methods based on petroleum soures generate large amounts of carbon monoxide, carbon dioxide, and other greenhouse gases, which are not environmentally friendly. Recent developments have allowed the production of polycarbonate materials from natural, starch-based vegetation. For example, bio-sourced polymers can be manufactured from corn, potatoes, sugarcane, and wheat. In one aspect, a bio-sourced polycarbonate can be produced from an isosorbide monomer. In another aspect, such an isosorbide monomer can be sourced from corn.

Bio-sourced polycarbonate (PC) can have a higher tensile modulus, higher tensile strength, and scratch resistance than conventional petroleum based polycarbonate. Bio-sourced polycarbonate can also have a higher melt flow rate (MVR) and lower glass transition temperature ($T_g$) than petroleum

TABLE 1

Raw materials Used.

| Component | Supplier | Description |
| --- | --- | --- |
| Iso ter PC | SABIC Innovative Plastics | Isosorbide-bisphenol A polycarbonate-C36 diacid terpolymer in the ratio of 65/28/7. |
| PC 105 | SABIC Innovative Plastics | BPA polycarbonate resin made by an interfacial process with an MVR at 300° C./1.2 kg, of 5.1-6.9 g/10 min. |
| PC 175 | SABIC Innovative Plastics | BPA polycarbonate resin made by the interfacial process with an MVR at 300° C./1.2 kg, of 5.1-6.9 g/10 min. |
| 172X | Sabic Innovative Plastics | BPA polycarbonate resin made by melt process with an MVR at 300° C./1.2 kg, of 23.5-28.5 g/10 min. |
| PC-ST | SABIC Innovative Plastics | Polysiloxane-polycarbonate copolymer comprising units derived from BPA and dimethylsiloxane. The dimethylsiloxane content is 20 wt. % |
| HBN-PC | SABIC Innovative Plastics | Nitrile polycarbonate |
| RDP | Daiachi Chem Coltd, Osaka, Japan | Resorcinol diphosphate |
| BPADP | Supresta | Bis-phenol A diphenyl phosphate |
| MBS | Rohm & Haas | Nominal 75-82 wt. % butadiene core with a balance styrene-methyl methacrylate shell, available under the tradename EXL-2691-A. |
| Metablen (SX005) | Mitsubishi Rayon Co., Ltd. | Core-shell impact modifier (core: silicone elastomer) & (shell: MMA copolymer) available under the tradename SX-005 |
| TSAN | SABIC Innovative Plastics | Polytetrafluoroethylene (PTFE) encapsulated by a styrene = acrylonitrile copolymer (SAN) (anti-drip agent) |

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure provides a bio-sourced polymer, such as, for example, a bio-sourced polycarbonate having improved flame retardancy. In one aspect, the inventive polymer exhibit at least one of good tensile strength, impact strength, heat deflection temperature based polycarbonate, enabling processing at lower temperatures, for example, about 250° C. Such lower processing temperatures can result in reduced energy consumption during manufacture. While these properties are advantageous for a bio-sourced polymer, the produced polymer can exhibit poor flame resistance and impact resistant.

In one aspect, the present disclosure provides copolymers and/or terpolymers comprising an isosorbide monomer. In one aspect, each of the compositions and methods described herein, unless specifically stated to the contrary, are directed to an Isosorbide BPAPC-C36 diacid (65/28/7) terpolymer ("Iso ter PC"). In other aspects, the compositions and methods described herein can relate to other isosorbide based polycarbonate materials, and the present invention is not intended to be limited to an Iso ter PC material. In still other aspects, the compositions described herein can comprise an isosorbide based polycarbonate material, such as Iso ter PC, and one or more other polycarbonate materials that can be bio-sourced, non bio-sourced, or a combination thereof.

Polycarbonate

In one aspect, the present disclosure provides an isosorbide-based polycarbonate. In various aspects, the isosorbide-based polycarbonates can have useful mechanical properties such as impact strength and transparency as well as a high content of biologically derived materials (i.e., polymer precursors that are derived from sustainable biological sources such as plants). In other aspects, the isosorbide-based polycarbonates can optionally have low background color, good UV stability, and good molecular weight (Mw) stability.

As used herein, the term "polycarbonate" includes homopolycarbonates and copolycarbonates have repeating structural carbonate units. In one aspect, a polycarbonate can comprise any polycarbonate material or mixture of materials as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In one aspect, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the isosorbide-based polycarbonate.

In yet another aspect, polycarbonates with branching groups are can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters).

In one aspect, an aliphatic-based polycarbonate comprises aliphatic units that are either aliphatic carbonate units derived from aliphatic diols, or a combination of aliphatic ester units derived from aliphatic diacids having greater than 13 carbons, in combination with isosorbide and aliphatic diols having greater than 13 carbons. Specifically, an isosorbide-based polycarbonate is an isosorbide-based copolycarbonate comprising an additional aliphatic carbonate unit derived from an aliphatic diol of greater than 13 carbons; or the isosorbide-based polycarbonate is an isosorbide-based polyester-polycarbonate comprising an ester unit.

In one aspect, the relative amount of each type of carbonate and/or ester unit present in an isosorbide-based polycarbonate can depend on the desired properties of the copolymer. In one aspect, the isosorbide-based polycarbonate or polyester-polycarbonate can comprise from about 55 mol % to 97.5 mol %, from about 60 mol % to about 95 mol %, or from about 65 mol % to about 90 mol % of isosorbide units.

In various aspects, the polycarbonate material of the present disclosure can comprise any suitable concentration of bio-sourced material. In one aspect, the polycarbonate of the present disclosure comprises from about 10 wt. % to about 60 wt. %, for example, 10, 11, 13, 15, 17, 19, 21, 23, 25, 27, 29, 31, 33, 35, 37, 39, 41, 43, 45, 47, 49, 51, 53, 55, 57, 59, or 60 wt. % of bio-sourced material. In another aspect, the polycarbonate of the present disclosure comprises from about 10 wt. % to about 25 wt. %, for example, about 10, 12, 14, 16, 18, 20, 22, 24, or 25 wt. %, or from about 15 wt. % to about 20 wt. %, for example, about 15, 16, 17, 18, 19, or 20 wt. % of bio-sourced material. In still other aspects, the polycarbonate material of the present disclosure can comprise less than about 10 wt. % or greater than about 60 wt. % of bio-sourced material and the present disclosure is not intended to be limited to any particular concentration of bio-sourced material.

In one aspect, the molecular weight of any particular polycarbonate, including the an isosorbide-based polycarbonate, can be determined by, for example, gel permeation chromatography using universal calibration methods based on polystyrene (PS) standards. Generally polycarbonates can have a weight average molecular weight (Mw), of greater than about 5,000 g/mol based on PS standards. In one aspect, the isosorbide-based polycarbonates can have an Mw of greater than or equal to about 39,000 g/mol, based on PS standards. In another aspect, the isosorbide-based polycarbonate (including isosorbide-based polyester-polycarbonate) has an Mw based on PS standards of 39,000 to 100,000 g/mol, specifically 40,000 to 90,000 g/mol, more specifically 40,000 to 80,000 g/mol, and still more specifically 40,000 to 70,000 g/mol. In another aspect, the isosorbide-based polycarbonate has an Mw based on polycarbonate (PC) standards of 20,000 to 70,000 g/mol, specifically 21,000 to 65,000 g/mol, more specifically 22,000 to 60,000 g/mol, and still more specifically 25,000 to 60,000 g/mol.

In another aspect, the isosorbide-based polycarbonate has a number averaged molecular weight (Mn) based on PS standards of 15,000 to 65,000 g/mol, specifically 16,000 to 60,000 g/mol, more specifically 17,000 to 55,000 g/mol, and still more specifically 18,000 to 50,000 g/mol. In one aspect, the polydispersity (Mw/Mn) for isosorbide-based polycarbonate is less than or equal to 3, specifically less than or equal to 2.5, more specifically less than or equal to 2.3. In a specific aspect, the polydispersity is 2.0 to 2.3.

Molecular weight (Mw and Mn) as described herein, and polydispersity as calculated therefrom, can be determined using gel permeation chromatography (GPC), using a crosslinked styrene-divinylbenzene column, and either PS or PC standards as specified. GPC samples can be prepared in a solvent such as methylene chloride or chloroform at a concentration of about 1 mg/ml, and can be eluted at a flow rate of about 0.2 to 1.0 ml/min.

In one aspect, the glass transition temperature ($T_g$) of an isosorbide-based polycarbonate can be less than or equal to 135° C. In another aspect, the glass transition temperature of an isosorbide-based polycarbonate can be from about 85° C. to about 130° C., from about 90° C. to about 130° C., from about 90° C. to about 125° C., or from about 90° C. to about 120° C.

In another aspect, polycarbonates, such as, for example, the isosorbide-based polycarbonates disclosed herein, can have a melt volume ratio (MVR) of about 0.5 to about 80 cm³/10 minutes, or from about 2 to about 40 cm³/10 minutes, measured at 250° C. under a load of 5 kg according to ASTM D1238-04. In other aspects, a polycarbonate can have a melt volume ratio of less than about 0.5 or greater than about 80 cm³/10 minutes, and the present invention is not intended to be limited to any particular melt volume ratio.

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, about 8 to about 10.

The isosorbide-based polycarbonate or polyester-polycarbonate can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl) carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

The melt polymerization can include a transesterification catalyst comprising a first catalyst, also referred to herein as an alpha catalyst, comprising a metal cation and an anion. In one aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O^{2-}$), thiolate (HS), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the isosorbide-based polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, a melt process employing an activated carbonate is utilized. As used herein, the term "activated carbonate", is defined as a diarylcarbonate that is more reactive than diphenylcarbonate in transesterification reactions. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate.

Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one aspect, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures can also be used as non-activated carbonates.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including an isosorbide-based polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In another aspect, the ester endgroup derived from a salicylic ester can be a residue of BMSC or other substituted or unsubstituted bis(alkyl salicyl)

carbonate such as bis(ethyl salicyl)carbonate, bis(propyl salicyl)carbonate, bis(phenyl salicyl)carbonate, bis(benzyl salicyl)carbonate, or the like.

In one aspect, where a combination of alpha and beta catalysts are used in the melt polymerization, an isosorbide-based polycarbonate polymer prepared from an activated carbonate can comprise endgroups in an amount of less than 2,000 ppm, less than 1,500 ppm, or less than 1,000 ppm, based on the weight of the polycarbonate. In another aspect, where only an alpha catalyst is used in the melt polymerization, an isosorbide-based polycarbonate polymer prepared from an activated carbonate can comprise endgroups in an amount of less than or equal to 500 ppm, less than or equal to 400 ppm, less than or equal to 300 ppm, or less than or equal to 200 ppm, based on the weight of the polycarbonate.

In one aspect, the reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., isosorbide, aromatic dihydroxy compound, and aliphatic diacid or diol). In a specific aspect, the molar ratio of activated aromatic carbonate to monomer unit compounds is 1.013 to 1.29, specifically 1.015 to 1.028. In another specific aspect, the activated aromatic carbonate is BMSC.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In one aspect, the aliphatic homopolycarbonate and aliphatic-aromatic copolycarbonate can be prepared in an extruder in presence of one or more catalysts, wherein the carbonating agent is an activated aromatic carbonate. In one aspect, the reactants for the polymerization reaction can be fed to the extruder in powder or molten form. In another aspect, the reactants are dry blended prior to addition to the extruder. The extruder can be equipped with pressure reducing devices (e.g., vents), which serve to remove the activated phenol by-product and thus drive the polymerization reaction toward completion. The molecular weight of the polycarbonate product can, in various aspects, be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product can also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, and sidestreams. One skilled in the art can find the best designs using generally known principals of commercial extruder design. Controlling the ratio diarylcarbonate/diol, specifically BMSC/diol can impact the Mw when using an activated carbonate. A lower ratio can generally give a higher molecular weight.

In one aspect, decomposition by-products of the reaction that are of low molecular weight can be removed by, for example, devolatilization during reaction and/or extrusion to reduce the amount of such volatile compounds. The volatiles typically removed can include unreacted starting diol materials, carbonate precursor materials, but are more specifically the decomposition products of the melt-polymerization reaction.

In one aspect, polymers with high isosorbide content can be difficult to process because of the high $T_g$ that accompanies homogeneous blocks of isosorbide carbonate units. Therefore compositions with isosorbide are expected to possess a somewhat higher $T_g$ compared to similar compositions based on BPA. Such runs of isosorbide carbonate units can traditionally require high processing temperatures of greater than or equal to 280° C., which can lead to degradation of the isosorbide carbonate units and thus the polycarbonate overall. In addition, isosorbide homopolymers, or isosorbide-based polycarbonates with high isosorbide carbonate unit content (translating to isosorbide block lengths of greater than about 20 isosorbide units) and prepared by interfacial polymerization methods can crystallize, making them more difficult to process than either isosorbide copolymers or non-isosorbide containing polycarbonates such as, for example, bisphenol A homopolycarbonate.

In addition to the isosorbide-based polycarbonates described above, thermoplastic compositions comprising combinations of the isosorbide-based polycarbonate with other thermoplastic polymers that do not comprise isosorbide-based carbonate units can be prepared using, for example other polycarbonates including homopolycarbonates and other polycarbonate copolymers (i.e., copolycarbonates). These combinations can comprise 1 to 99 wt %, specifically 10 to 90, more specifically 20 to 80 wt % of the isosorbide-based polycarbonate, with the remainder of the compositions being other of the foregoing additional polymers, and/or additives as described below. In an aspect, the thermoplastic composition comprises the isosorbide-based polycarbonate, an additional polymer, and/or an additive.

In addition to the isosorbide-based polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition.

In other aspects, a polycarbonate composition can comprise one or more of an antioxidant, heat stabilizer, light stabilizer, UV absorbing additive, plasticizer, lubricant, mold release agent, antistatic agent, colorant (e.g., pigment and/or dye), or a combination thereof.

Thermoplastic compositions comprising the isosorbide-based polycarbonate can be manufactured by various methods. For example, powdered isosorbide-based polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

The process disclosed herein can be used to prepare aliphatic polycarbonate and aliphatic-aromatic copolycarbonates having a weight average molecular weight (Mw) of greater than about 39,000 g/mol. The glass transition temperature (Tg) of the isosorbide-based polycarbonates can be less than or equal to about 135° C. The number average molecular weights (Mn) of the aliphatic-aromatic copolycarbonate is greater than about 17,000 g/mol. The homo and copolycarbonates disclosed herein can further exhibit lower Refractive Index (RI), transparency (high % transmission and low haze), higher scratch resistance and lower oxygen permeability compared to conventional BPA homopolycarbonate. Furthermore, the disclosed homo and copolycarbonates are also optically active where prepared using enantiomerically pure or enantiomerically enriched aliphatic diol (e.g., D-(+)-isosorbide, and the like).

In various aspects, the homo and copolycarbonates can be used in making various articles including, but not limited to a film, a sheet, an optical wave guide, a display device and a light emitting diode prism. Furthermore the polycarbonates can be used in making articles such as, exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by automotive, truck, military vehicle, and motorcycle exterior and interior components, including panels, quarter panels, rocker panels, trim, fenders, doors, decklids, trunklids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

Polycarbonate Blends

In another aspect, the polycarbonate material of the present invention can comprise a blend of polycarbonate and at least one other polymeric material. In one aspect, the polycarbonate itself can comprise a mixture or blend of polycarbonate materials (e.g., a mixture of bio-sourced polycarbonate and bisphenol A sourced polycarbonate). In one aspect, the polycarbonate can comprise one or more other polymers, such as, for example, a PC175, CTG65, or a combination thereof. In another aspect, the one or more other polymeric materials mixed and/or blended with a polycarbonate can comprise a polymer system capable of maintaining and/or improving the heat deflection temperature of the resulting material. In various aspects, a polycarbonate can be mixed and/or blended with polyphenylene ether (PPO), BPAPC-PPPBP, BPADP, 3-phenylsulfonylbenezenesulfonic acid potassium salt (KSS), Rimer salts, polytetrafluoroethylene encapsulated poly(styrene-co-acrylonitrile), a SEBS block copolymer, PTFE, or a combination thereof. In still other aspects, the polycarbonate material, such as, for example, Iso ter PC, can be mixed and/or blended with other polymers, such as, for example, high heat polymers, not specifically recited herein. One of skill in the art, in possession of this disclosure, could readily select an appropriate polycarbonate and/or polycarbonate blend material.

Impact Modifier

The polycarbonate of the present invention comprises one or more impact modifiying agents, or impact modifiers. In one aspect, suitable impact modifiers are can be high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. In another aspect, a combination of any two or more individual impact modifiers can be used.

An exemplary type of impact modifier is an elastomer-modified graft copolymer comprising an elastomeric (i.e., rubbery) polymer substrate having a $T_g$ less than about 10° C., less than about −10° C., or about −40° C. to −80° C., and a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). In another aspect, an impact modifier can comprise an acrylic impact modifier, such as, for example, a DURASTRENGTH® impact modifier, available from Arkema Inc., Philadelphia, Pa., USA. In another aspect, an impact modifier can comprise an ABS and/or bulk ABS material. In yet another aspect, an impact modifer can comprise a polysiloxane-polycarbonate copolymer (PC-ST), for example, comprising units derived from BPA and dimethylsiloxane. In another aspect, an impact modifer can comprise a core-shell impact modifier, such as, for example, a silicone-acrylic rubber compound (e.g., silicone elastomer core and MMA copolymer shell; METABLEN® SX005, available from Mitsubishi Rayon Co., Ltd.). In yet another aspect, an impact modifier can comprise two or more individual impact modifying compounds, such as, for example, PC-ST and METABLEN®.

In one aspect, an impact modifiers can comprise from about 1 wt. % to 30 wt %, for example, about 1, 2, 4, 6, 8, 10, 12, 14, 16, 18, 20, 22, 24, 26, 28, or 30 wt. %, based on the total weight of the isosorbide-based polycarbonate, and any additional polymer including impact modifier, in the composition. In another aspect, an impact modifier or combination of impact modifiers can comprise from about 1 wt. % to about 15 wt. %, for example, about 1, 3, 5, 7, 9, 11, 13, or 15 wt. %, from about 1 wt. % to about 10 wt. %, for example, about 1, 2, 3, 4, 5, 6, 7, 8, 9, or 10 wt. %, or from about 5 wt. % to about 7 wt. %, for example, about 5, 5.5, 6, 6.5, or 7 wt. %. In one aspect, a thermoplastic composition comprises approximately equal amounts (i.e., by wt. %) of a PC-ST impact modifier and a METABLEN® impact modifier. In one aspect, a thermoplastic composition can comprise from about 5 wt. % to about 7 wt. % of PC-ST and from about 5 wt. % to about 7 wt. % of METABLEN®. In a specific aspect, a polycarbonate composition comprises about 6 wt. % PC-ST and about 6 wt. % METABLEN® impact modifier. In other aspects, the a specific amount of any one or more impact modifiers can vary, based on the remaining components in the system and desired properties of the resulting polymer. One of skill in the art, in possession of this disclosure, could readily select an appropriate amount of any one or more impact modifiers to use in a polymer composition.

In one aspect, the addition of a single impact modifier can provide modest improvements to the impact performance of a flame retardant bio-sourced polycarbonate. While not wishing to be bound by theory, it is believed that the combination of multiple impact modifers can provide a synergistic improvement over conventional systems. In a specific aspect, addition of both PC-ST and METABLEN® impact modifiers can provide a synergistic improvement of up to, for example, a three-fold increase in impact properties. This surprising improvement is unexpected given the performance of each impact modifier alone.

In one aspect, a polycarbonate without an additional impact modifer can have a Notched Izod Impact rating of about 2, or less than about 2.5. In another aspect, a polycarbonate comprising a single impact modifier, such as, for example, MBS, PC-ST, and/or a METABLEN® impact modifier can have a Notched Izod Impact (NII) rating of from about 5 to about 10. In one aspect, the inventive polycarbonate system comprising a mixture of at least two impact modifiers, for example, PC-ST and METABLEN® impact modifer, can have a Notched Izod Impact rating of at least about 10 kJ/m$^2$ at 23° C., at least about 15 kJ/m$^2$ at 23° C., at least about 20 kJ/m$^2$ at 23° C., at least about 25 kJ/m$^2$ at 23° C., or more. In another aspect, the inventive polycarbonate can have a NII rating of at least about 10 kJ/m$^2$ at 23° C. In another aspect, the inventive polycarbonate can have a NII rating of at least about 15 kJ/m$^2$ at 23° C. In another aspect, the inventive polycarbonate can have a NII rating of at least about 20 kJ/m$^2$ at 23° C. In another aspect, the inventive polycarbonate can have a NII rating of at least about 25 kJ/m$^2$ at 23° C. In another aspect, the inventive polycarbonate has a NII rating of about 25 kJ/m$^2$ at 23° C. In still another aspect, the inventive polycarbonate has a NII rating of about 27 kJ/m$^2$ at 23° C. In still other aspects, the particular NII rating of a polycarbonate system can vary, and can, in some aspects, exceed 27 kJ/m$^2$ at 23° C. Thus, the present invention is not intended to be limited to any particular NII rating.

Flame Retardant Additive

As noted above, it can be challenging to achieve a desired flame retardancy without adversely affecting the desirable physical properties of the compositions, such as, for example, maintaining molecular weight. In various aspects, the inventive compositions and methods disclosed herein can provide a desirable flame retardancy while maintaining physical properties of the composition. The polymer composition of the present invention comprises a flame retardant additive. In one aspect, the flame retardant additive can comprise an organic compound containing phosphorus, such as, for example, an organophosphorus compound. In another aspect, the flame retardant comprises an organophosphorus compound comprising an aliphatic metal phosphinate. In yet another aspect, the flame retardant comprises a bis-phenol A diphenyl phosphonate (BPADP), for example, available from Supresta.

In another aspect, the flame retardant additive is free of or substantially free of bromine and/or chlorine. In still another aspect, at least a portion of the flame retardant additive is free of or substantially free of bromine and/or chlorine. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of the composition, excluding any filler.

In one aspect, the flame retardant additive or a portion thereof comprises an organic phosphate and/or an organic compound containing a phosphorus-nitrogen bond. In one aspect, exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide.

In another aspect, an exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Exemplary aromatic phosphates include, phenyl bis (dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. In one aspect, the flame retardant of the present invention comprises BPADP. In still other aspects, the flame retardant can comprise a mixture of two or more individual flame retardant compositions.

While not wishing to be bound by theory, the addition of a flame retardant additive, such as, for example, a bis-phenol A diphenylphosphonate, can improve the flame retardancy of the resulting polycarbonate material, but can also result in a decreased molecular weight retention.

In various aspects, the phosphorus-containing flame retardant of the present invention can be present in amounts of from about 10 wt. % to about 25 wt. % of the total composition, for example, about 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, or 25 wt. %; or from about 10 wt. % to about 15 wt. %, for example, about 10, 10.5, 11, 11.5, 12, 12.5, 13, 13.5, 14, 14.5, or 15 wt. %. In another aspect, the phosphorus-containing flame retardant of the present invention can be present at about 20 wt. % of the composition. In other aspects, the amount of flame retardant present in the compositions of the present invention can be less than about 10 wt. % or greater than about 25 wt. %, and the present invention is not intended to be limited to any particular concentration.

Other Additives

In other aspects, the inventive polycarbonate can comprise one or more other materials that can maintain and/or improve various properties of the resulting material. In various aspects, the inventive polycarbonate can comprise an epoxy, an anti-drip agent, filler, or a combination thereof.

In one aspect, the inventive polycarbonate composition comprises an epoxy, such as, for example, a dime acid diglycidyl ester epoxy (DADGE®, available from Aldrich), a 3,4-epoxy cyclohexyl methyl-3,4-epoxy cyclohexane carboxylate (ERL-4221, available from Aldrich), a modified styrene acrylic polymer (ADR-4368F, available from Aldrich), or a combination thereof. In other aspects, the inventive polycarbonate composition can comprise an epoxy material not specifically recited herein, provided that such an epoxy material is chemically compatible with the remaining components of the composition and that the epoxy material does not adversely affect the desired properties of the composition. In one aspect, the inventive polycarbonate comprises DADGE. In another aspect, the inventive polycarbonate comprsises ERL-4221. In yet another aspect, the inventive polycarbonate comprises ADR-4368F. In another aspect, the inventive polycarbonate does not comprise an epoxy. An epoxy material, if present, can be present at any concentration that can maintain or improve the properties of the resulting material. In various aspects, an epoxy material can be present in an amount of from about 0.1 wt. % to about 5 wt. %, for example, about 0.1, 0.3, 0.5, 0.7, 0.9, 1.2, 1.4, 1.6, 1.8, 2, 2.5, 3, 3.5, 4, 4.5, or 5 wt. %; or from about 0.5 wt. % to about 1.0 wt. %, for example, about 0.5, 0.6, 0.7, 0.8, 0.9, or 1 wt. %. In other aspects, an epoxy material can be present in an amount less than about 0.1 wt. % or greater than about 5 wt. %, and the present invention is not intended to be limited to any particular epoxy concentration. In one aspect, a polycarbonate material comprises about 0.5% of an epoxy material, such as, for example, ADR-4368F. In another aspect, a polycarbonate material comprises about 1.0 wt. % of an epoxy material, such as, for example, ADR-4368F.

In one aspect, the presence of an epoxy material can provide improved flame retardancy, improved retention of molecular weight, or a combination thereof. In a specific aspect, a polycarbonate composition comprising ADR-4368F can exhibit an improved molecular weight retention of up to about 85%, while also improving the flame retardancy properties of the material.

In another aspect, the inventive polycarbonate composition can comprise one or more anti-drip agents. In various aspects, an anti-drip agent, if present, can comprise a fibril forming or non-fibril forming fluoropolymer, such as, for example, polytetrafluoroethylene (PTFE). In another aspect, an anti-drip agent, if present, can be encapsulated by a rigid copolymer, such as, for example, a styrene-acrylonitrile copolymer (SAN). In one aspect, the inventive polycarbonate composition comprises PTFE encapsulated in SAN (TSAN). In various aspects, encapsulated fluoropolymers can be made by polymerizing the encapsulating polymer in the presence of the fluoropolymer, for example, in an aqueous dispersion.

In one aspect, TSAN can provide significant advantages over PTFE, in that TSAN can be more readily dispersed in the composition. An exemplary TSAN can comprise about 50 wt % PTFE and about 50 wt % SAN, based on the total weight of the encapsulated fluoropolymer. The SAN can comprise, for example, about 75 wt % styrene and about 25 wt % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. In one aspect, the inventive polycarbonate can comprise from about 0.1 wt. % to about 10 wt. %, for example, about 0.1, 0.2, 0.3, 0.5, 0.7, 0.9, 1, 3, 5, 7, 9, or 10 wt. % of an anti-drip agent, based on 100 percent by weight of isosorbide-based polycarbonate, and any additional polymer that can optionally be present. In another aspect, the inventive polycarbonate can comprise from about 0.1 wt. % to about 1 wt. %, for example, about 0.1, 0.2, 0.3, 0.4, 0.5, 0.6, 0.7, 0.8, 0.9, or 1 wt. %, or from about 0.5 wt. % to about 1.5 wt. %, for example, about 0.5, 0.6, 0.7, 0.8, 0.9, 1, 1.1, 1.2, 1.3, 1.4, or 1.5 wt. % of an anti-drip agent, based on 100 percent by weight of isosorbide-based polycarbonate, and any additional polymer that can optionally be present. In one aspect, the inventive polycarbonate composition comprises about 0.5 wt. % TSAN. Anti-drip agents are commercially available, and one of skill in the art, in possession of this disclosure, could readily select an appropriate anti-drip agent, if desired.

In various aspects, an anti-drip agent, if present, can provide at least one of improved flame retardancy, increased HDT, improved molecular weight retention, or a combination thereof. In one aspect, an inventive polycarbonate composition comprising a TSAN anti-drip agent can exhibit improved flame retardance, increased HDT, and improved molecular weight retention.

In another aspect, the inventive polycarbonate composition can comprise a filler, such as, for example, an inorganic filler. The specific composition of a filler, if present, can vary, provided that the filler is chemically compatible with the remaining components of the polycarbonate composition. In one aspect, the polycarbonate composition comprises a filler, such as, for example, talc. If present, the amount of filler can comprise any amount suitable for a polycarbonate composition that does not adversely affect the desired properties thereof. In one aspect, the inventive polycarbonate comprises about 1 wt. % to about 10 wt. % of a filler.

In another aspect, a filler can comprise silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

In one aspect, a filler, if present, can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Flame Retardancy

In one aspect, the flame retardancy of a polycarbonate material can be determined using standardized test criteria, such as, for example, UL 94 tests. Thin articles present a particular challenge in the UL 94 tests, because compositions suitable for the manufacture of thin articles tend to have a higher flow. Thermoplastic compositions suitable for the manufacture of a variety of articles will generally have a melt volume rate (MVR) of about 4 to about 30 g/10 minutes measured at 260° C./2.16 kg in accordance with ASTM D1238. Within this range, for thin wall applications, the MVR can be adjusted to greater than about 8, preferably greater than about 10, more preferably greater than about 13 g/10 minutes, measured at 260° C./2.16 kg in accordance with ASTM D1238.

Melt viscosity can provide an alternative indication flow. Thermoplastic compositions as described herein suitable for the manufacture of thin articles can have a melt viscosity at 260° C./1500 sec$^{-1}$ of about 50 to about 500 Pascal-second, measured in accordance with ISO 11443. In some aspects, the compositions meet the UL V2 criterion.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, hand held electronic device housings such as housings for cell phones, electrical connectors, and components of lighting fixtures, ornaments, home appliances, roofs, greenhouses, sun rooms, swimming pool enclosures, and the like. The above-described compositions are of particular utility in the manufacture of articles comprising a minimum wall thickness of as low as about 0.1 mm, 0.5 mm, 1.0 mm, or 2.0 mm (about indicating ±10%). The above-described compositions are also of particular utility in the manufacture of articles comprising a minimum wall thickness of about 3 mm or less, e.g., about 0.1 mm to about 2 mm, e.g., about 1.2 mm to about 2 mm, or about 0.2 mm to about 1.8 mm or, more specifically, about 0.6 mm to about 1.5 mm or about 0.8 mm to about 1.2 mm.

Flammability tests were performed following the procedure of Underwriter's Laboratory Bulletin 94 entitled "Tests for Flammability of Plastic Materials, UL94." According to this procedure, materials can be classified as HB, V0, UL94 V1, V2, 5VA, and/or 5VB on the basis of the test results obtained for five samples. The criteria for each of these flammability classifications are described below and elsewhere herein.

V0: In a sample placed so that its long axis is 180 degrees to the flame, the period of flaming and/or smoldering after removing the igniting flame does not exceed ten seconds and the vertically placed sample produces no drips of burning particles that ignite absorbent cotton.

V1: In a sample placed so that its long axis is 180 degrees to the flame, the period of flaming and/or smoldering after removing the igniting flame does not exceed thirty seconds and the vertically placed sample produces no drips of burning particles that ignite absorbent cotton.

V2: In a sample placed so that its long axis is 180 degrees to the flame, the average period of flaming and/or smoldering after removing the igniting flame does not exceed twenty-five seconds, but the vertically placed samples produce drips of burning particles that ignite cotton. Five bar flame out time is the sum of the flameout time for five bars, each lit twice for a maximum flame out time of 250 seconds.

5VB: a flame is applied to a vertically fastened, 5-inch (127 mm) by 0.5-inch (12.7 mm) test bar of a given thickness above a dry, absorbent cotton pad located 12 inches (305 mm) below the bar. The thickness of the test bar is determined by calipers with 0.1 mm accuracy. The flame is a 5-inch (127 mm) flame with an inner blue cone of 1.58 inches (40 mm). The flame is applied to the test bar for 5 seconds so that the tip of the blue cone touches the lower corner of the specimen. The flame is then removed for 5 seconds. Application and removal of the flame is repeated for until the specimen has had five applications of the same flame. After the fifth application of the flame is removed, a timer (T-0) is started and the time that the specimen continues to flame (after-flame time), as well as any time the specimen continues to glow after the after-flame goes out (after-glow time), is measured by stopping T-0 when the after-flame stops, unless there is an after-glow and then T-0 is stopped when the after-glow stops. The combined after-flame and after-glow time must be less than or equal to 60 seconds after five applications of a flame to a test bar, and there can be no drips that ignite the cotton pad. The test is repeated on 5 identical bar specimens. If there is a single specimen of the five does not comply with the time and/or no-drip requirements then a second set of 5 specimens are tested in the same fashion. All of the specimens in the second set of 5 specimens must comply with the requirements in order for material in the given thickness to achieve the 5VB standard.

Time to drip: The time to drip is determined by alternately applying and removing a flame as described for the 5VB test in consecutive 5-second intervals, until the first drip of material falls from the bar. A time to drip characteristic of 55 seconds (s) or greater has been found to correlate well with other desired characteristics such as 5VB ratings.

Flame retardancy can also be analyzed by calculation of the average flame out time, standard deviation of the flame out time, as the total number of drips, and using statistical methods to convert that data to a prediction of the probability of first time pass, or "pFTP", that a particular sample formulation would achieve a V0 "pass" rating in the conventional UL94 testing of 5 bars. Preferably pFTP will be as close to 1 as possible, for example greater than 0.9 and more preferably greater than 0.95, for maximum flame-retardant performance in UL testing. A pFTP of 0.85 or greater is deemed to be successful.

In various aspects, the inventive polycarbonate composition can comprise any one or combination of the above recited additives. In an exemplary aspect, an Iso ter PC composition comprises BPADP and TSAN. In another aspect, an Iso ter PC comprises BPADP, TSAN, PC-ST, and METABLEN® impact modifier. In another aspect, an Iso ter PC comprises a flame retardant additive, an anti-drip agent, PC-ST, and METABLEN® impact modifier.

Properties of Improved Bio-Sourced Polycarbonate

In one aspect, the inventive polycarbonate can exhibit at least one of improved impact resistance, improved flame resistance, improved heat deflection temperature, improved retention of molecular weight, or a combination thereof. In another aspect, the inventive polycarbonate exhibits improved impact resistance, and at least one of improved flame resistance, improved heat deflection temperature, improved retention of molecular weight, or a combination thereof.

In various aspects, HDR measurements were determined using a 4 mm thick (+10%) bar per ISO 75/Ae at 1.8 MPa; MVR results were determined at 260° C. using a 2.16 kilogram load per ASTM D1238, and NII measurements were determined on one-eighth inch (3.18 mm) bars per ASTM D256 at room temperature (23° C.).

While typical aspects have been set forth for the purpose of illustration, the foregoing descriptions should not be deemed to be a limitation on the scope of the invention. Accordingly, various modifications, adaptations, and alternatives can occur to one skilled in the art without departing from the spirit and scope of the present invention.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Iso Ter PC/BPAPC Blend Properties

In a first example, physical properties of various Iso ter PC/BPAPC blends were evaluated, as illustrated in Table 2, below.

TABLE 2

Properties of Iso-ter-PC/BPAPC Blends

| Formulation | CTG65 | CPC70/30 | CPC50/50 | CPC30/70 | BPAPC (PC 105) |
|---|---|---|---|---|---|
| Iso ter PC | 100 | 70 | 50 | 30 | 100 |
| PC 175 | | 30 | 50 | 70 | |
| | | | | | |
| Total | 100 | 100 | 100 | 100 | 100 |
| Bio Content (Wt. %) | | | 29.7 | 0.5 | 0 |
| Tensile Modulus (MPa) | 2762.6 | 2866.7 | 2754.2 | 2551.8 | 2350.0 |
| St. Dev. | 56.8 | 82.4 | 33.9 | 79.7 | 100 |
| Elongation at Break (%) | 15.0 | 53.1 | 76.1 | 39.0 | 120.0 |
| St. Dev. | 2.4 | 16.0 | 6.0 | 5.1 | |
| Tensile Strength (MPa) | 50.4 | 55.3 | 49.8 | 49.7 | 68.0 |
| St. Dev. | 0.9 | 1.4 | 1.1 | 2.5 | |
| HDT | 71.8 | 84.8 | 93.9 | 109.0 | 132.0 |
| MVR (245° C. with 5 kg) | 19 | 19 | 19 | 11 | 6 |
| UL 94 Flame Out Time (s) | 446 | 328 | 244 | 187 | 107 |
| UL 94 FR Rating at 3 mm | — | — | — | V2 | V2 |
| TGA Degradation On-Set | 321 | 331 | 346 | 361 | 438 |

The Iso ter PC sample exhibited good tensile modulus and flow (MVR) properties, but burned to the support clamp in one ignition in the Underwriters Laboratory flame test (UL 94), resulting in no rating. With increasing BPAPC content, both heat deflection temperature (HDT) and flame resistance (flame-out-time) are improved. With 30% of Iso ter PC (bio-content of 17.8%), the Iso ter PC/BPAPC blends (CPC30/70) provided a V2 rating in UL 94 test. The thermogravimetric profile of the above blends were characterized via thermogravimetric analysis (TGA) and it was found that the on-set of degradation temperature (1% degradation or weight loss) of blends increases with BPAPC content as expected.

2. Effect of BPAPD and TSAN

In a second example, the effect of BPAPD and TSAN on Iso ter PC/BPAPC blends was determined. The flame retardant additives (BPADP and TSAN) were added to improve flame resistance of the blended compositions. The results of this analysis are detailed in Table 3, below.

TABLE 3

Effect of BPADP and TSAN on properties of Iso ter PC/BPAPC 30/70 blend composition.

| Formulation | CPC30 | CP30B10 | CP30B12 | CP30B12T1 |
|---|---|---|---|---|
| Iso ter PC | 30 | 30 | 30 | 30 |
| PC 175 | 70 | 30 | 22 | 21 |
| 172X + 25% BPADP Masterbatch | | 40 | 48 | 48 |
| TSAN | | | | 1 |
| | | | | |
| Total | 100 | 100 | 100 | 100 |
| Bio Content (Wt. %) | | | | |
| Tensile Modulus (MPa) | 2552 | 2517 | 2975 | 2960 |
| St. Dev. | 80 | 187 | 195 | 128 |
| Elongation at Break (%) | 39 | 16.4 | 4.17 | 8.25 |
| St. Dev. | 5 | 1.3 | 4.34 | 4.70 |
| Tensile Strength (MPa) | 49.7 | 49.6 | 57 | 55 |
| St. Dev. | 2.5 | 0.8 | 10 | 12 |
| HDT 1.8 MPa Flat (° C.) | 109.0 | 84.1 | 74.4 | 76.0 |
| NII at 23° C. (kJ/m$^2$) | 2.1 | 2.4 | 2.1 | 2.3 |
| MVR (250° C. with 5 kg) | 11 | 39 | 90 | 70 |
| FR Rating at 3 mm | V2 (215 s) | V2 (20 s) | V2 (12 s) | |
| FR Rating at 2.3 mm | | V2 (24 s) | V2 (12 s) | |

TABLE 3-continued

Effect of BPADP and TSAN on properties of Iso ter PC/BPAPC 30/70 blend composition.

| Formulation | CPC30 | CP30B10 | CP30B12 | CP30B12T1 |
|---|---|---|---|---|
| FR Rating at 2 mm | | | | V2 (12 s) |
| FR Rating at 1.6 mm | | | | V2 (11 s) |

Addition of 12% BPADP significantly reduced the flame-out time (RN) of the blend composition. The MVR of these blends were appeared to be two-fold improved compared to Iso ter PC/BPAPC blends (CPC30). However, the notched izod impact (NII) strength of these blends is very low.

As illustrated in Table 3, the addition of a small amount of TSAN (1%) to the blend composition with BPADP significantly improved the flame resistance of the blend composition, resulting in a UL94 rating of VO at 1.6 mm. This is a significant improvement in flame resistance of engineering bio-based polymer blends with 17.8% bio-content with good retention of HDT, MVR and tensile properties.

3. Anti-Drip Behavior

In a third example, the anti-drip behavior of nitrile PC (HBN-PC) in Iso ter PC/BPAPC blends was evaluated, as illustrated in Table 4, below.

TABLE 4

Effect of H8N-PC on FR performance of Iso ter PC/BPAPC blends.

| Formulation | CP30B10 | CP30H30B10 |
|---|---|---|
| Iso ter PC | 30 | 30 |
| PC 175 | 30 | |
| HBN | | 30 |
| 172X + 25% BPADP | 40 | 40 |
| | | |
| Total | 100 | 100 |
| Bio Content (Wt. %) | | |
| Tensile Modulus (MPa) | 2517 | 2812 |
| St. Dev. | 187 | 73 |
| Elongation at Break (%) | 16.4 | 2.26 |
| St. Dev. | 1.3 | 0.26 |
| Tensile Strength (MPa) | 49.6 | 53.52 |
| St. Dev. | 0.8 | 4.78 |
| HDT 1.8 MPa Flat (° C.) | 84.1 | 79.40 |
| NII at 23° C. (kJ/m$^2$) | 2.4 | 2.18 |
| MVR (250° C. with 5 kg) | 39 | 53.7 |
| FR Rating at 3 mm | V2 (20 s) | |

TABLE 4-continued

Effect of H8N-PC on FR performance of Iso ter PC/BPAPC blends.

| Formulation | CP30B10 | CP30H30B10 |
|---|---|---|
| FR Rating at 2.3 mm | V2 (24 s) | |
| FR Rating at 2 mm | | V2 (28.2 s) |

Addition of 30% of HBN-PC to an Iso ter PC/BPAPC blend (10% BPADP, denoted CP30H30B10 in Table 4) resulted in a significant improvement in flame retardancy performance. Moreover, addition of HBN-PC resulted in improved tensile modulus and MVR of the resulting blend, but also in a reduction of HDT and elongation at break.

4. Anti-Drip Behavior

In a fourth example, the effect of various impact modifiers on Iso ter PC/BPAPC blends was evaluated. Specifically, the impact performance of Iso ter PC blends with two core-shell impact modifiers (MBS unsaturated core and Metablen saturated core) was examined. The results of this analysis are detailed in Table 5, below.

TABLE 5

Effect of Impact Modifiers

| Formulation | CP30B12T1 | CP30CP30B12T1MBS6 | CP30B12T1SX | C30B12T1_ST2 |
|---|---|---|---|---|
| Iso ter PC | 30 | 30 | 30 | 30 |
| PC 175 | 21 | 15 | 15 | |
| 172X + 25% BPADP | 48 | 48 | 48 | 48 |
| TSAN | 1 | 1 | 1 | 1 |
| MBS | | 6 | | |
| Metablen (SX005) | | | 6 | |
| PC-ST (20% Si) | | | | 21 |
| Total | 100 | 100 | 100 | 100 |
| Bio Content (Wt. %) | | | | |
| Tensile Modulus (MPa) | 2960 | 2667 | 2378 | 2542 |
| St. Dev. | 128 | 93 | 35 | 68 |
| Elongation at Break | 8.25 | 8.51 | 13 | 41 |
| St. Dev. | 4.70 | 3.83 | 4 | 13 |
| Tensile Strength (MPa) | 55 | 50 | 44 | 46 |
| St. Dev. | 12 | 7 | 1 | 1 |
| HDT 1.8 MPa Flat (° C.) | 76.0 | 74.0 | 74.0 | 73.9 |
| NII at 23° C. (kJ/m²) | 2.3 | 9.96 | 8.6 | 6.21 |
| MVR (250° C. with 5 | 70 | 57 | 34 | 22 |
| FR Rating at 3 mm | | | | |
| FR Rating at 2.3 mm | | | | |
| FR Rating at 2 mm | | | V0 | |
| FR Rating at 1.6 mm | | | V1 (65 s) | V0 |

Both the MBS and Metablen impact modifiers improved the impact performance of the Iso ter PC blends; however, the flame resistance of blends with MBS is significantly affected, resulting in no rating in UL 94 flame test at 3 mm. While not wishing to be bound by theory, this is likely due to the presence of unsaturated bonds (butadiene) in the core of the MBS, which can act as a fuel and result in deterioration of flame resistance. The blends with Metablen retained their flame resistance by giving V0 at 2 mm and VI at 1.6 mm in a UL 94 flame test. It is believed that the cross-linked siloxane core of Metablen can improve char formation during ignition, aiding in retention of flame resistance in the blend. The Iso ter PC/BPAPC 30/70 blend composition with 12% BPADP and 1% TSAN along with 6% of Metablen exhibited good tensile, impact, HDT, MVR and flame resistance properties, while having a bio-content of 17.8%.

Additionally, a polycarbonate-siloxane copolymer (PC-ST) was added as an impact modifier in one of the Iso-ter PC/BPAPC blend samples. Addition of the PC-ST provided a slight improvement in notched Izod impact, while retaining V0 FR performance up to 1.6 mm.

5. Combination of Impact Modifiers

In a fifth example, different levels of PC-ST and Metablen were evaluated along with a combination of PC-ST and Metablen. The results are presented in Table 6.

TABLE 6

The effect of PC-ST, Metablen and its combination in !so ter PC/BPAPC blends on impact and FR performance.

| Formulation | 1 | 2 | 3 | 4 | 5 | 6 |
|---|---|---|---|---|---|---|
| CTG65 | 30 | 30 | 12 | 30 | 30 | 30 |
| CTG65 + 25% BPADP | | | 24 | | | |
| PC175 | 17 | 11 | 11 | 11 | 9 | 5 |
| PC172 + 25% BPADP | 52 | 52 | 28 | 52 | 52 | 52 |
| PC-ST | | 6 | 24 | | | 6 |
| Metablen SX005 | | | | 6 | 8 | 6 |
| TSAN | 1 | 1 | 1 | 1 | 1 | 1 |
| Total | 100 | 100 | 100 | 100 | 100 | 100 |
| Bio Content (Wt. %) | | | | | | |
| Tensile Modulus (MPa) | 2574 | 2559 | 2466 | 2394 | 2506 | 2328 |
| Elongation at Break | 19.9 | 79.6 | 33.8 | 12.2 | 10.3 | 34.9 |
| Tensile Strength (MPa) | 46.7 | 48.0 | 44.6 | 42.2 | 48.3 | 43.8 |

TABLE 6-continued

The effect of PC-ST, Metablen and its combination in Iso ter PC/BPAPC blends on impact and FR performance.

| Formulation | 1 | 2 | 3 | 4 | 5 | 6 |
|---|---|---|---|---|---|---|
| HDT 1.8 MPa Flat (° C.) | 77.1 | 72.7 | 70.8 | 69.8 | 69.0 | 70.3 |
| NII at 23° C. (kJ/m$^2$) | 2.0 | 5.3 | 7.6 | 8.6 | 9.3 | 27.0 |
| MVR (250° C. with 5 FR Rating at 3 mm | 33.3 | 30.7 | 27.6 | 30.2 | 27.6 | 28.7 |
| FR Rating at 2.3 mm | | | | | V1 | |
| FR Rating at 2 mm | | | | | V1 | |
| FR Rating at 1.6 mm | | | | | V1 | V1 |

The increase in the amount of PC-ST and Metablen improved the impact performance of the Iso ter PC/BPAPC blends. The addition of PC-ST can retain the V0 performance up to 1.6 mm. Moreover, the addition of both 6% of PC-ST and 6% of Metablen in Iso-ter-PC/BPAPC blends with 13% BPADP and 1% TSAN resulted in a significant improvement in impact properties (27 kJ/m$^2$), together with retention of FR V0 performance up to 1.6 mm. Thus, a synergy exists when both PC-ST and Metablen are used in combination. This synergy can result in a three-fold enhancement in impact properties, along with retention of flame retardant properties.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polycarbonate blend prepared using a polycarbonate precursor comprising a biosourced isosorbide, the polycarbonate blend further comprising:
   a. a phosphorus containing flame retardant composition; and
   b. an impact modifier comprising a combination of a polysiloxane-polycarbonate copolymer and a silicone elastomer core-acrylic shell impact modifier,
wherein the polycarbonate blend has a notched izod impact rating of at least about 60% higher than a notched izod impact rating of a reference polycarbonate blend prepared using the polycarbonate precursor comprising the biosourced isosorbide, the reference polycarbonate blend further comprising the phosphorus containing flame retardant composition and an impact modifier consisting of either the polysiloxane-polycarbonate copolymer or the silicone elastomer core-acrylic shell impact modifier.

2. The polycarbonate blend of claim 1, wherein the polycarbonate precursor comprises at least about 10 wt. % of bio-sourced isosorbide.

3. The polycarbonate blend of claim 1, wherein the polycarbonate precursor comprises at least about 15 wt. % of bio-sourced isosorbide.

4. The polycarbonate blend of claim 1, wherein the polycarbonate precursor comprises from about 15 wt. % to about 20 wt. % of bio-sourced isosorbide.

5. The polycarbonate blend of claim 1, wherein the phosphorus containing flame retardant composition comprises an organophosphorus compound.

6. The polycarbonate blend of claim 1, wherein the phosphorus containing flame retardant composition comprises a bis-phenol A diphenyl phosphonate.

7. The polycarbonate blend of claim 1, wherein the phosphorus containing flame retardant composition comprises from about 10 wt. % to about 15 wt. % of the total polycarbonate blend.

8. The polycarbonate blend of claim 1, further comprising an anti-drip agent.

9. The polycarbonate blend of claim 8, wherein the anti-drip agent comprises PTFE encapsulated SAN (TSAN).

10. The polycarbonate blend of claim 8, wherein the blend comprises about 0.5 wt. % of the anti-drip agent.

11. The polycarbonate blend of claim 1, having an improved flame retardancy over a conventional bio-sourced polycarbonate material.

12. The polycarbonate blend of claim 1, wherein the blend comprises about 6 wt. % of bis-phenol A diphenyl phosphonate.

13. The polycarbonate blend of claim 1, wherein the impact modifier comprises about 6 wt. % of silicone elastomer core-acrylic shell impact modifier.

14. The polycarbonate blend of claim 1, having a notched izod impact rating of at least about 10 kJ/m$^2$.

15. The polycarbonate blend of claim 1, having a notched izod impact rating of at least about 15 kJ/m$^2$.

16. The polycarbonate blend of claim 1, having a notched izod impact rating of at least about 20 kJ/m$^2$.

17. The polycarbonate blend of claim 1, having a notched izod impact rating of at least about 25 kJ/m$^2$.

18. A method for processing a polycarbonate blend, the method comprising contacting a polycarbonate precursor comprising a biosourced isosorbide with a phosphorus containing flame retardant composition and an impact modifier comprising a polysiloxane-polycarbonate copolymer and a silicone elastomer core-acrylic shell impact modifier,
   wherein the polycarbonate blend has a notched izod impact rating of at least about 60% higher than a notched izod impact rating of a reference polycarbonate blend having the polycarbonate precursor comprising the biosourced isosorbide, the phosphorus containing flame retardant composition, and an impact modifier consisting of either the polysiloxane-polycarbonate copolymer or the silicone elastomer core-acrylic shell impact modifier.

19. The method of claim 18, further comprising contacting an anti-drip additive with the polycarbonate precursor.

* * * * *